Aug. 5, 1930.  E. L. FONSECA  1,772,441
THERMOSTATIC CONTROL MECHANISM
Filed Aug. 6, 1925   2 Sheets-Sheet 1
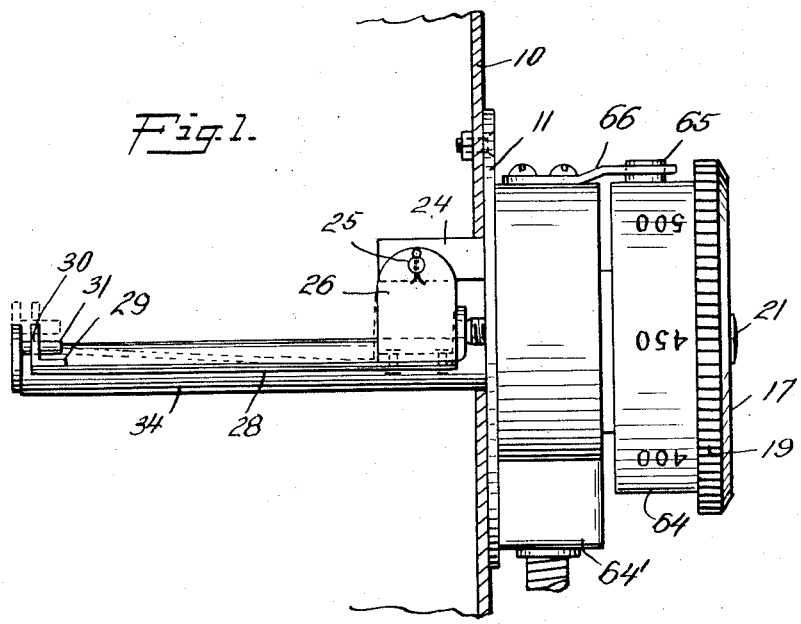
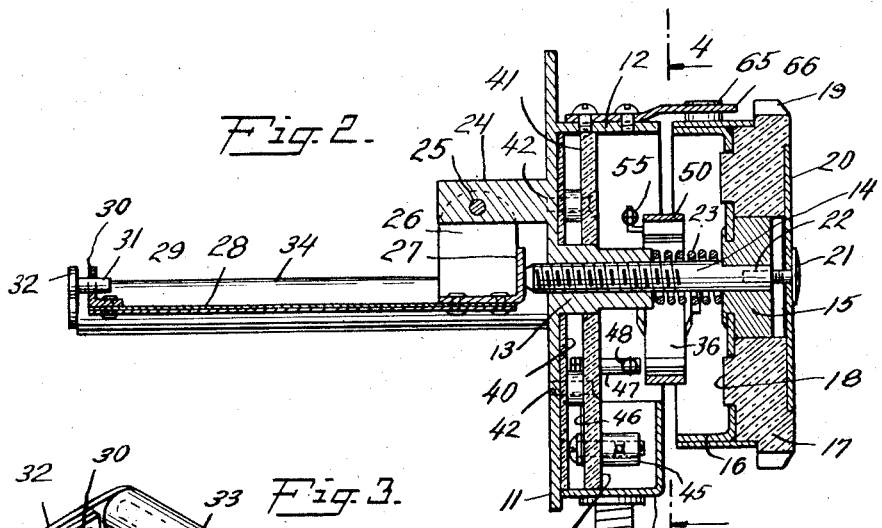
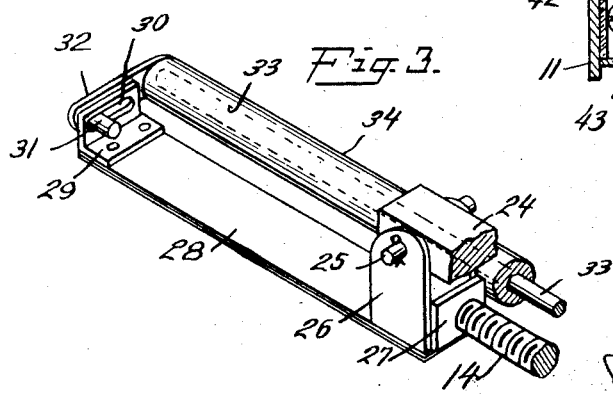

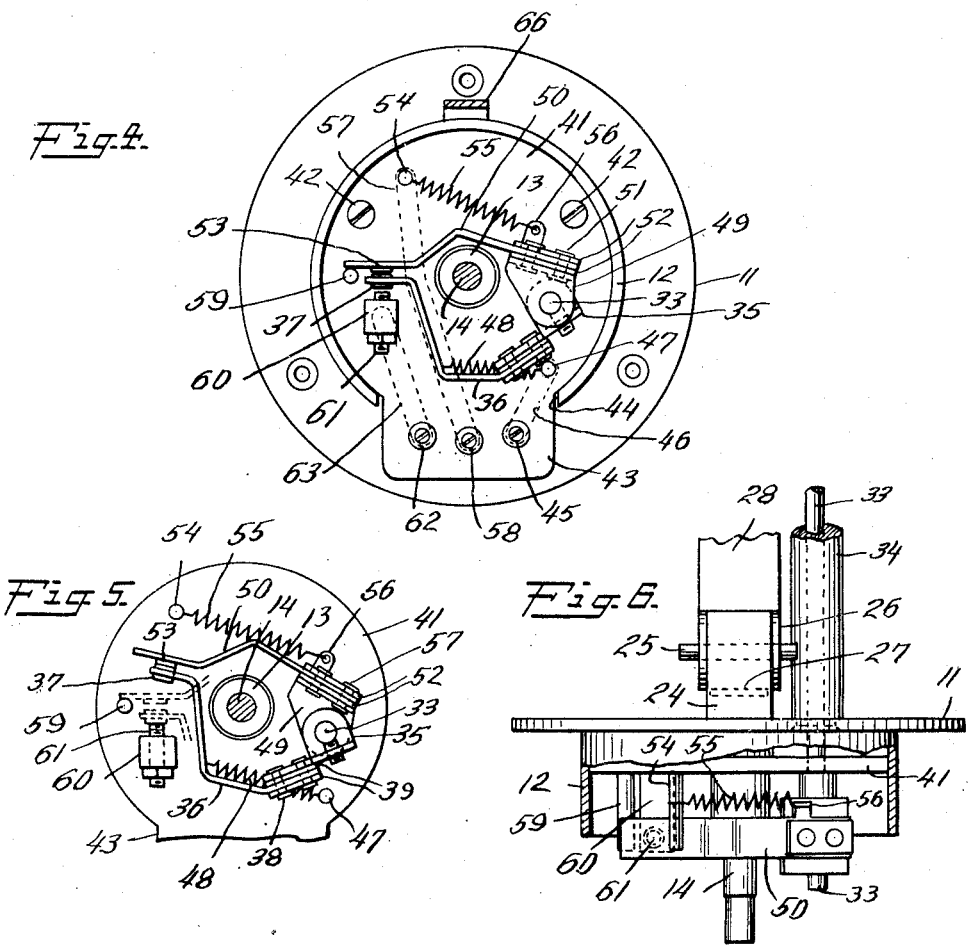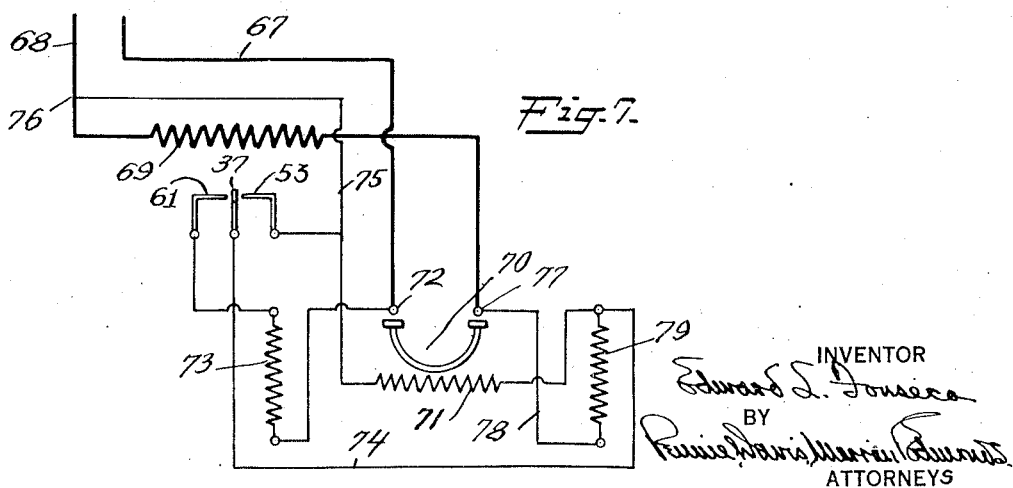

Patented Aug. 5, 1930

1,772,441

UNITED STATES PATENT OFFICE

EDWARD L. FONSECA, OF NEWARK, NEW JERSEY, ASSIGNOR TO THE WILCOLATOR COMPANY, OF NEWARK, NEW JERSEY, A CORPORATION OF DELAWARE

THERMOSTATIC CONTROL MECHANISM

Application filed August 6, 1925. Serial No. 48,501.

This invention relates to thermostatic control mechanisms, and more particularly to control mechanisms of the type in which an element which is sensitive to variations in temperature, is arranged to control the operation of an electric switch. The present mechanism is particularly adapted for use in electric heating devices, the thermostatic element being exposed to the heat generated by the flow of current and serving to regulate the flow by means of the switch and other suitable connections so that a constant and uniform temperature may be maintained. This mechanism is designed primarily for use in an electric cooking stove and will be described in that particular adaptation, although it is to be understood that it is capable of many similar applications, of which its use in a cooking stove is typical.

At the present time electric cooking stoves or ranges have come into increasingly wide use, with the lowering of rates for current, since such ranges are cleaner, more easily handled, and in other respects more generally satisfactory than other forms of cooking devices, especially in small apartments. Owing to the fact that the current rates are still quite high, it is essential that these stoves should be provided with some means by which the heating effect of the current may readily be controlled. A thermostatic control mechanism is the most desirable for the purpose, since it permits uniform conditions to be maintained in the oven chamber for given periods of time, and provides for the maintenance of an even cooking temperature at any desired value. Such devices should be capable of being installed on the stove without any considerable alteration, and should be arranged so that their operation is readily understood and their manipulation quite simple.

The present invention is directed to the provision of a thermostatic control mechanism of the type described, which is particularly adapted for use in cooking stoves, and which meets the conditions above specified. This mechanism may be installed as a unit in the wall of the oven chamber, and it consists of a few simple parts, so that it is cheap and easy to construct, and is not likely to get out of order through wear of the parts. All of the operating mechanism is enclosed and concealed, although readily accessible when occasion demands.

The present mechanism includes a thermostatic element of any suitable type which is placed in the chamber to be heated. Disposed in the side of the chamber is a casing containing a switch which operates through a relay to control the flow of current to the heating unit in the chamber. The switch is operated by the expansion and contraction of the thermostatic element and adjusting mechanism is provided by which the movements of the element resulting from temperature variations, may be utilized to actuate the switch to maintain uniform temperature conditions. The relay operates a circuit closer and the circuits through the relay controlled by the switch are adapted to close the circuit closer whenever the temperature in the oven chamber falls below a predetermined value, and to open the circuit closer when another temperature has been exceeded. The relay also includes a maintaining circuit arranged so that when the thermostatic element has brought about the closing of the circuit closer, thus establishing a circuit through the heating unit, this latter circuit will be maintained until the circuit closer is again opened by the action of the thermostatic element. Accordingly, when the temperature in the oven falls below a selected value, the heating unit is connected to the source of energy, and the connection is maintained until a second selected temperature is reached, when the deformation of the element will cause the main circuit to be opened. The difference between the two temperatures at which the thermostatic element comes into operation to perform the functions mentioned, represents the range of fluctuation of temperature in the oven, and the apparatus is capable of adjustment so that this range may be as narrow as may be desired. Ordinarily the fluctuation will be slight, but sufficient to prevent the circuit closer from being opened and closed upon slight variations in the current flowing from the source of energy.

The apparatus permits the oven to be maintained at any selected temperature throughout a wide range and is capable of easy adjustment so that a change from one temperature to another is a simple operation. Also, the mechanism is so constructed that, in such readjustment, no injury can occur to the delicate thermostatic element due to its deformation by previous exposure to high temperatures.

One embodiment of the invention, in a form suitable for installation in a cooking stove, is illustrated in the accompanying drawings, in which Fig. 1 is a view of the device in side elevation, showing its installation in the wall of the stove, Fig. 2 is a view similar to Fig. 1, but showing certain of the parts in longitudinal section, Fig. 3 is a view in perspective of the thermostatic element and the parts operated by it, Fig. 4 is a transverse sectional view on the line 4—4 of Fig. 2, Fig. 5 is a face view of certain parts illustrated in Fig. 4, but showing the contact members in different positions of adjustment, Fig. 6 is a plan view of the parts shown in Fig. 4 with certain of the parts broken away, and Fig. 7 is a diagram of the circuits employed with the device.

Referring now to these drawings, the device is shown in Fig. 1 installed through the outer wall 10 of the cooking chamber of a stove. For this purpose the wall is cut away to form an aperture through which the thermostatic element and certain associated parts may be inserted, the opening being covered by the base plate 11, on which the exposed parts of the mechanism are mounted. This base plate is provided with an upstanding flange 12, forming a casing in which the switch mechanism is placed. The base plate is also provided with a central threaded boss 13, in which is disposed a threaded spindle 14, the rear end of which projects beyond the base plate.

At its outer end the spindle has attached to it a hub 15, carrying a plate 16, terminating in an up-standing flange. A disc 17 having a central aperture fits over the hub, and is provided with lugs 18, entering suitable apertures formed in the plate. This disc is formed of heat insulating material, and has a serrated rim 19. It serves as the operating handle of the device, and the serrations permit it to be readily grasped and moved. A circular plate 20 fits in a recess formed in the outer face of the disc, and a headed screw 21 passing through an opening in the plate 20, is threaded into an opening 22 in the end of the spindle 14. A spring 23 encircling the spindle, bears at one end against the boss 13 and at the other against the hub 15, and by tightening the screw 21 the various parts mounted on the end of the shaft are held fast in position against the pressure of the spring.

Extending inwardly from the face of the base plate 11, into the oven chamber through the opening in the wall of the oven, is a lug 24, carrying a pin 25, on which is pivotally mounted a stirrup 26, provided with a plate 27 forming an abutment adapted to bear against the rear end of the spindle 14. One end of the thermostatic element 28 is riveted to the lower face of the stirrup. This thermostatic element may be of any desired type, but is preferably formed of two metals having different rates of expansion, welded or otherwise secured together face to face. The element is so formed that it will bow downwardly as illustrated in Fig. 2, upon an increase in temperature. At its rear end, the element carries an ear or bracket 29, having an elongated slot 30, in which is received a pin 31, extending rearwardly from the face of an arm 32 mounted on a rod 33. This rod passes through a tube 34, secured in any convenient manner to the rear face of the base plate 11.

The rod extends through the base plate into the casing formed by the flange 12, and on its inner end has rigidly attached to it a stirrup 35, secured to which is an arm 36, carrying a double contact 37 on either face near its end. The arm is secured to the stirrup by rivets 38, strips of insulation 39, being placed between the arm and the stirrup, and also between the arm and the heads of the rivets, so that the arm is insulated from the stirrup.

Within the flange 12 is a disc of insulating material 40, lying against the inner face of the base plate, and a similar disc of insulating material 41 is mounted within the flange by insulated screws 42. The disc 41 is placed in spaced relation to the inner face of the base plate. The disc 41 has an extension 43, extending through an opening 44 in the wall of the flange 12, and secured to this extension and projecting upright beyond it, are terminals. One of these terminals 45 is electrically connected by a metallic strip 46, to a pin 47, secured in the disc 41 and projecting upwardly beyond it. A spring 48 secured to this pin is also attached at its other end to the arm 36, so that contacts 37 are electrically connected through the arm, the spring, and the pin to the terminal 45. The spring is attached at such a point on the arm that the latter may swing throughout a considerable range without tensioning the spring to any great extent.

Loosely mounted on the end of the rod 33 is a stirrup 49, engaging the rod on either side of the stirrup 35. An arm 50 is secured to the stirrup 49, by rivets 51, and layers of insulation 52 are placed between the stirrup and the arm, and also between the arm and the heads of the rivets, so that the arm is insulated from the stirrup. The arm carries at its outer end a contact 53, adapted to engage one face of the double contact 37, on the arm 36. A pin 54 mounted in the insulating disc 41, and projecting upwardly therefrom, has secured to it a spring 55, the other end of which is secured to a lug 56 on the arm 50. A strip of conducting material 57 mounted on the under face of the disc 41, connects the pin 54 to the central terminal 58, and the arrangement of the parts is such that the contact 53 is electrically connected to the terminal 58 through the arm, the spring, the pin, and the strip. A pin 59 mounted in the disc 41, serves as a stop for the end of the arm 50.

Mounted on the disc 41, is a third contact block 60, having a fixed contact 61 mounted in it in such a way that this contact will cooperate with the double face contact 37 on the arm 36. The contact 61 in the block 60 is arranged so that its position may be adjusted. The contact 61 is connected through the block to the terminal 62 through a strip of conducting material 63 mounted on the under face of the disc 41. The several terminals are normally covered by a removable plate 64' provided with an opening through which the end of a cable carrying the wires connected to the different terminals is led.

Mounted on the flange 16 is a scale 64, on which temperatures are indicated, and if desired this scale may also carry designations at the proper temperatures of different foods which are to be cooked at these temperatures. The scale may be made in the form of a strip, the ends of which are connected by a rivet or screw 65, the head of this screw serving as a stop which contacts with an indicator 66 secured to the flange 12. In order to maintain any indicated temperature within the oven, the disc 17 is rotated until the indicated temperature comes beneath the pointer 66 and this varies the action of the thermostat in the following manner:

The rotation of the disc causes the spindle to be moved inwardly or outwardly through the boss 13 and thereby varies the relation of the end of the spindle to the abutment 27. The thermostat is arranged so that it will bend upwardly upon an increase in temperature. If the end of the spindle is set at spaced relation to the abutment, the bending of the thermostat will cause the stirrup 26 to swing on its pivot until the abutment contacts with the end of the spindle. The forward end of the thermostatic element thereupon becomes fixed, and a further increase in temperature will cause the rear end to bend upwardly, so that the bracket 29 will engage the pin 31 on the arm 32, causing the rod 33 to be rocked. The rocking of the rod causes the arm 36 to move upwardly, as shown in Fig. 5. In its normal position, the arm 36 is in the lowermost position with one of the contact members 37 engaging the fixed contact 61 and establishing a circuit presently to be described. When the rod 33 is rocked, carrying the arm upwardly, this circuit is first broken by the movement of the arm away from the face of the contact 61, and the movement continues until eventually the arm bears against the contact carried by the upper arm 50, when the second circuit is established. The stop pin 59 maintains the movable arm 50 spaced from but in proximity to the arm 36, when the latter is at rest against the fixed contact, and the variation in temperature which causes a movement of the thermostatic element sufficient to bring the contact on arm 36 against the contact on arm 50, is the range of fluctuation of temperature permitted within the oven.

The electrical circuits used in connection with the control mechanism are shown in Fig. 7 the heavy lines 67 and 68 being the cables leading to a source of electrical energy. The heating element by which the oven is heated is indicated at 69, and the three contacts employed in the mechanism are designated 53, 37, and 61, as in the other views. A circuit closer generally designated 70, is employed in the circuit, this circuit closer including an operating solenoid 71 actuating an armature, as is customary in such devices. When the main switch, (not shown) of the stove is closed, and the control mechanism adjusted for any desired temperature, the contact 37 will lie against contact 61, whereupon a circuit is closed through terminal 72 of the circuit breaker, through resistance 73, contact 61, contact 37, line 74, solenoid 71, and line 75 to the other side of the source of energy at the point 76. The solenoid is now energized to close the main line through the heating element 69, whereupon the oven begins to heat up. As soon as the temperature for which the device is set has been reached in the oven, the thermostatic element will bend and cause a movement of the rod 33, resulting in the arm 37 taking the central position between contacts 53 and 61, as shown in Fig. 7. The circuit previously described through the solenoid is now broken, but the solenoid is maintained in energized condition by current flowing as follows: From the connected terminals 72 and 77, through line 78, resistance 79, solenoid 71, line 75, to the point 76. Accordingly, current will flow through the heating element even though the contact 37 has moved away from the contact 61.

When the temperature in the oven exceeds the value for which the device is set, the thermostatic element will cause a movement of the rod 33 sufficient to bring the contact 37 against the contact 53. When this condition is arrived at, a shunt circuit is established around the solenoid as follows: From terminal 77, through line 78, resistance 79, line 74, contact 37, contact 53, and line 75 to terminal 76, and the solenoid is now short circuited, and the circuit closer opens. This cuts off the flow of current through the heating element, and the oven begins to cool down. When the cooling has proceeded to the point where the temperature in the oven drops below that for which the device is set, the contact 37 will have moved over against the contact 61, whereupon a circuit is again established through the solenoid and the circuit closer again closed, connecting the heating unit in circuit with the source of energy. It will thus be seen that the movement of the thermostatic element causing the contact 37 to move from contact 61 to contact 53, determines the extent to which the temperature within the oven may fluctuate, and by adjusting the contact 61 in the block 60, this contact may be placed quite close to the contact 53 on arm 50, when the latter is against the stop pin 59. Thus the limit of fluctuation may be cut down to a small temperature range, thereby permitting a close regulation of conditions within the oven.

Provision is also made in this device for protecting the thermostatic element against injury due to resetting the mechanism for different temperatures. When a high temperature is to be maintained in the oven, as for example, 500°, the disc 18 with its dial will be moved so that the end of the spindle 14 lies at a considerable distance from the abutment 27. As the oven heats up, the thermostatic element will bow downwardly and its forward end, connected to the crank arm 32, will be held stationary, while its rear end causes the stirrup to be swung on the pivot until the abutment 27 strikes the end of the spindle. Further bowing of the element, due to an increase in temperature, will cause the forward end of the element to move the crank arm 32, thus causing an angular movement of the rock shaft and the swinging of the movable contact arm, as previously described. When the desired temperature is reached, therefore, the thermostatic element will have bowed to a considerable extent and if the oven is now to be used immediately for cooking at a lower temperature, before the oven has had a chance to cool, the dial will be turned in a direction which will cause the spindle to bear against the abutment and swing the stirrup outwardly. This operation, however, can cause no injury to the thermostatic element in its bowed condition, because the outward swing of the stirrup 26 results in the movable arm connected to the rock shaft being swung upwardly so as to carry with it the upper movable arm. This movement is against the tension of the springs connected to the arms, but as these springs are comparatively weak, no excessive strain is placed on the thermostatic element. As the oven cools down, the extent of bowing of the element is diminished until eventually the upper movable arm will be swung down to a position against the stop. By having the upper contact normally stationary, but free to be moved when occasion arises, the mechanism can be reset regardless of the condition of the thermostatic element without causing injury to the latter.

Before the device is installed, it is set for any given temperature by securing the disc 18 to the end of the spindle, and moving the latter until a position is reached in which the thermostatic element will cause the arm 36 to be moved free of the fixed contact when exposed to the test temperature. The strip 64 is now placed on the disc in such position that the test temperature lies beneath the pointer 66, the indications on the strip having previously been positioned in accordance with the type of element to be used. When any desired temperature is to be maintained in the oven, the disc is moved until that temperature on the strip lies beneath the pointer, whereupon the spindle will have been moved so that its end lies in proper relation to the abutment 27. When the temperature of the oven reaches the desired value, the thermostatic element will have expanded to such an extent that the arm 36 will move to intermediate position, and when the temperature is exceeded the arm will bear against the upper arm and the circuit previously described will be established, thus cutting off the current to the heating unit.

It will be seen that the instrument is simple and compact, and that all the working parts are enclosed and protected. The manipulation of the device is easy, so that the regulation of temperature in the oven is quite simple. As the device is automatic in action, it requires no attention after it has been set for the desired temperature, and such a temperature will be maintained in the oven within narrow limits for any desired period of time.

I claim:

1. In a thermostatic control mechanism, the combination of a temperature-responsive element mounted for swinging movement, a pair of separated contacts, an arm mounted independently of the element and carrying a contact lying between said separated contacts, a connection between the element and said arm and extending parallel to said element, this connection being effective to move the arm as the element responds to changes in temperature, and means for varying the effectiveness of the connection.

2. In a thermostatic control mechanism, the combination of an element responsive to temperature changes and mounted for swinging movement, a pair of separated contacts, an arm mounted independently of the element and carrying a contact lying between said separated contacts, a connection between the element and said arm and extending parallel to said element, this connection being effective to move the arm as the element responds to changes in temperature, and means operable at predetermined temperatures only for holding a portion of the element against movement developed by a temperature change whereby movement of the remainder of the element moves the arm through the connection.

3. In a thermostatic control mechanism, the combination of a thermostatic strip having a part movable to different positions in accordance with temperature changes, this strip being mounted for swinging movement about a point, a pair of separated contacts, an arm mounted independently of the element and carrying a contact lying between said separated contacts, a connection between the movable part of the strip and the arm, this connection extending substantially parallel to said strip and being effective to move the arm as the strip is affected by different temperatures, and means adapted to engage the strip and effective at predetermined temperatures only to cause movement of said part thereof to be transmitted to said arm.

4. In a thermostatic control mechanism, the combination of a thermostatic strip pivotally mounted at one end, the other end being movable to different positions as the strip warps in response to temperature changes, a pair of spaced contacts, an arm lying between the said contacts and carrying a contact movable into engagement with one or the other of the spaced contacts, and a rod extending parallel to said strip and connected to the movable end thereof and to the arm, this rod transmitting the movement of the said end to the arm.

5. In a thermostatic control mechanism, the combination of a thermostatic strip pivotally mounted at one end, the other end being movable to different positions as the strip warps in response to temperature changes, a pair of spaced contacts, a pivoted arm lying between the said contacts and carrying a contact adapted to be engaged with one or the other of the spaced contacts as the arm is moved on its pivot, a rod extending substantially parallel to the axis of the strip, one end of said arm being secured thereto, a connection between the rod and the movable end of the strip such that the movement of said end causes a rocking of the rod, and means for varying the effect of movements of said end on the rod.

6. In a thermostatic control mechanism, the combination of an element responsive to temperature changes, a pair of contacts lying in spaced relation, an arm mounted independently of the element and carrying a contact lying between the said contacts, a connection between the thermostatic element and the arm arranged to cause the arm to move toward one or the other of the contacts as the element is influenced by temperature changes, and means operable at predetermined temperatures to cause the movement of the element resulting from temperature changes to be transmitted through the connection to the arm.

7. In a thermostatic control mechanism, the combination of a thermostatic element, a pair of contacts lying in spaced relation, one of these contacts being movable relative to the other, a movable arm mounted independently of the element and carrying a contact lying between the contacts first mentioned, a connection between the arm and the thermostatic element arranged to move the arm toward one or the other of the contacts as the element is effected by temperature changes, and means operable at predetermined temperatures only for holding one part of the thermostatic element fixed, whereby an increase in temperature will cause a movement of the remainder of the element to move the arm.

8. In a thermostatic control mechanism, the combination of a pair of contacts lying in spaced relation, one of these contacts being movable relative to the other, a swinging arm mounted independently of the element and carrying a contact lying between the contacts first mentioned and in one direction of movement adapted to engage and carry with it the movable contact first mentioned, a thermostatic element, a connection between the element and the swinging arm such that the expansion of the latter will cause a swinging of the arm, and adjusting means for rendering the connection effective to transmit movements of the thermostatic element to the arm only at or above a predetermined temperature only.

9. In a thermostatic control mechanism, the combination of a thermostatic element, a pair of contacts lying in spaced relation, a swinging arm mounted independently of the element and carrying a contact lying between the contacts first mentioned, a connection between the element and the arm such that the expansion of the element will cause a swinging of the arm, and means operable at predetermined temperatures for rendering the connection effective.

10. In a thermostatic control mechanism, the combination of a pair of contacts arranged in spaced relation, a swinging arm carrying a contact arranged to lie between the contacts first mentioned, a rod on which the arm is carried, a flat thermostatic strip extending parallel to said rod and adapted on temperature changes to warp out of its normal plane, and a connection between the element and the rod operable to cause a rocking movement of the rod as the element is affected by temperature changes.

11. In a thermostatic control mechanism, the combination of a pair of contacts arranged in spaced relation, a swinging arm carrying a contact arranged to lie between the contacts first mentioned, a rod on which the arm is carried, a thermostatic element, a connection between the element and the rod operable to cause a rocking movement of the rod as the element is affected by temperature changes, and means for preventing movement of a part of the thermostat operable only when a predetermined temperature is reached.

12. In a thermostatic control mechanism, the combination of a pair of contacts arranged in spaced relation, a swinging arm carrying a contact arranged to lie between the contacts first mentioned, a rod on which the arm is carried, a thermostatic element arranged to bend upon temperature changes, a connection between one end of the element and the rod such that the rod is rocked upon a bending movement of the element, an abutment secured to the other end of the element, and means adapted to bear against the abutment when a predetermined temperature is reached for preventing further movement of this end of the element.

13. In a thermostatic control mechanism, the combination of a pair of contacts arranged in spaced relation, a swinging arm carrying a contact arranged to lie between the contacts first mentioned, a rod on which the arm is carried, a thermostatic element arranged to bend upon temperature changes, one end of this element being pivotally mounted, the other loosely connected to a lever carried by the rod, an abutment carried by the pivoted end of the element, and a spindle adapted to bear against said abutment and render the element effective to rock the rod.

14. In a thermostatic control mechanism, the combination of a pair of contacts arranged in spaced relation, a swinging arm carrying a contact arranged to lie between the contacts first mention, a rod on which the arm is carried, a thermostatic element arranged to bend upon temperature changes, one end of this element being pivotally mounted, the other loosely connected to a lever carried by the rod, an abutment carried by the pivoted end of the element, a spindle adapted to bear against said abutment and render the element effective to rock the rod, and a dial for setting the position of the spindle to cause it to be engaged by the abutment at a predetermined temperature.

15. In a thermostatic control mechanism, the combination of a stationary contact, an arm carrying a contact and normally held in definite spaced relation to the stationary contact, a second arm carrying a contact lying between the contacts first mentioned, both arms being movable about the same axis and the second arm being biased to a position in which its contact is in engagement with the stationary contact, and a thermostatic element arranged to cause a movement of the second arm away from the stationary contact when a predetermined temperature is exceeded to bring the contact on said second arm into engagement with the contact on the first arm.

16. In a thermostatic control mechanism, the combination of a thermostatic element, a switch arm actuated thereby, a contact adapted to be engaged by the arm, a second contact adapted to be engaged by the arm when the latter is out of engagement with the first contact, a pivotal mounting for the second contact permitting it to be swung from its normal position by the arm as the latter is moved past the point of normal engagement of the contact on the arm with said second contact by said element, and a manually adjustable means for regulating the action of the thermostatic element.

17. In a thermostatic control mechanism. a rock shaft, a crank arm thereon, a thermostatic element supported at one end on the arm, a pivotal mounting for the other end of the element, a manually-positioned adjustable member coacting with the pivotally mounted end of the element, and temperature-regulating means actuated by movements of the rock shaft effected by the thermostatic element through the said crank arm.

18. In a thermostatic control mechanism, the combination of a stationary contact, a movable arm carrying a contact adapted to engage the stationary contact, a thermostatic element remote from the arm and continuously connected thereto, said arm being mounted independently of the element, and means operable to cause movement of the element resulting from temperature variations to be transmitted to the arm only when a predetermined temperature is reached.

19. In a thermostatic control mechanism, the combination of a thermostatic element mounted to swing about an axis near one end thereof, a member mounted independently of the element and connected thereto to be moved by warping of the element in response to temperature changes, and means effective upon warping of the element to a predetermined extent to prevent swinging of the element in one direction upon said axis whereby further warping of the element causes a movement of said member.

20. In a thermostatic control mechanism, the combination of a thermostatic element mounted at one end to swing about an axis, a member mounted independently of said element and connected to the other end thereof to be moved by warping of said element in response to temperature changes, and means for engaging said element and limiting the swinging movement thereof on said axis whereby further warping of said element on a further temperature rise causes said member to move.

21. In a thermostatic control mechanism, the combination of a substantially flat thermostatic strip mounted at one end to swing about an axis, a member mounted independently of said strip, a connection between the member and the other end of said strip, said connection normally maintaining said strip against movement on its axis, said strip upon exposure to a rise in temperature warping to cause a swinging thereof relative to said axis, and an adjustable stop engageable with said element to limit said swinging movement whereby warping of the strip thereafter causes a movement of said member through said connection.

22. In a thermostatic control mechanism, the combination of a substantially flat thermostatic strip, a rod extending parallel to the strip, a pivotal mounting for one end of the strip, a crank connecting the rod and the other end of the strip, a member mounted independently of the strip and connected to the rod, and a stop for engaging the strip and limiting its movement with respect to its pivotal mounting resulting from warping of the strip due to a rise in temperature, further warping of said strip after said stop becomes effective causing a movement of said rod and member.

23. In a thermostatic control mechanism, the combination of a thermostatic element mounted to swing about a transverse axis, a member mounted independently of the element and connected thereto to be moved by distortion of the element in response to temperature changes, and means effective on distortion of the element to a predetermined extent to prevent swinging of said element in one direction upon said axis whereby further distortion of said element causes a movement of said member.

24. In a thermostatic control mechanism, the combination of a flat thermostatic strip adapted to warp about a transverse axis and mounted to swing about an axis parallel to the axis on which the element warps, a member mounted independently of the element and connected thereto to be moved by warping of the element in response to temperature changes, and means effective upon warping of the element to a predetermined extent to prevent swinging of the element in one direction upon said axis whereby further warping of the element causes a movement of said member.

In testimony whereof I affix my signature.

EDWARD L. FONSECA.